United States Patent [19]
Matsuoka et al.

[11] Patent Number: 5,186,045
[45] Date of Patent: Feb. 16, 1993

[54] THERMAL AIR-FLOW SENSOR

[75] Inventors: Hiroki Matsuoka, Susono; Kenichi Ono, Chiryu, both of Japan

[73] Assignee: Toyota Jidosha Kabushiki Kaisha, Toyota, Japan

[21] Appl. No.: 656,802

[22] Filed: Feb. 15, 1991

[30] Foreign Application Priority Data

Feb. 16, 1990 [JP] Japan .................... 02-33857

[51] Int. Cl.$^5$ ........................... G01M 19/00
[52] U.S. Cl. ................................. 73/118.2
[58] Field of Search ............... 73/118.2, 202.5, 204.15, 73/204.16, 204.17, 204.18

[56] References Cited
U.S. PATENT DOCUMENTS 4,860,222 8/1989 Schmidt et al. .................. 73/118.2
4,987,877 1/1991 Nakaniwa ......................... 73/118.2

FOREIGN PATENT DOCUMENTS 55-50121  4/1980 Japan .
61-147924 9/1986 Japan .
61-147925 9/1986 Japan .

Primary Examiner—Robert Raevis
Attorney, Agent, or Firm—Kenyon & Kenyon

[57] ABSTRACT

A thermal type air flow sensor wherein a heat generating element is arranged in an intake system, and a time for obtaining an increase in a temperature of a predetermined value is detected, which time corresponds to an amount of the intake air. The values of the intake air amount are averaged through one full cycle. This time is measured repeatedly at predetermined intervals during one full cycle of the pulsation, and a variation rate is calculated for values of the intake air amount obtained at two consecutive timings by a ratio of the difference of these values from the sum of these values. The average values of the intake air amount is corrected in accordance with this variation rate, to thus obtain a precise intake air amount.

3 Claims, 8 Drawing Sheets

THERMAL AIR-FLOW SENSOR

BACKGROUND OF THE INVENTION

1. Field of the Invention

The present invention relates to a sensor for detecting an amount of intake air used for a control apparatus for an internal combustion engine.

2. Description of the Related Art

Known in a prior art is a thermal type airflow meter which includes a heat generating body arranged in an intake line of an internal combustion engine. A time for obtaining an increase of the temperature of a predetermined value of the body is measured, and an amount of the intake air is obtained from the measured time. The greater the increase of the speed of the intake air corresponding to the amount of the intake air, the longer the time needed for obtaining an increase of the temperature to the predetermined value. The measurement of this time makes it possible to determine the amount of intake air flowing into the internal combustion engine. (See Japanese Patent Publication No. 55-50121.)

Figure 1:
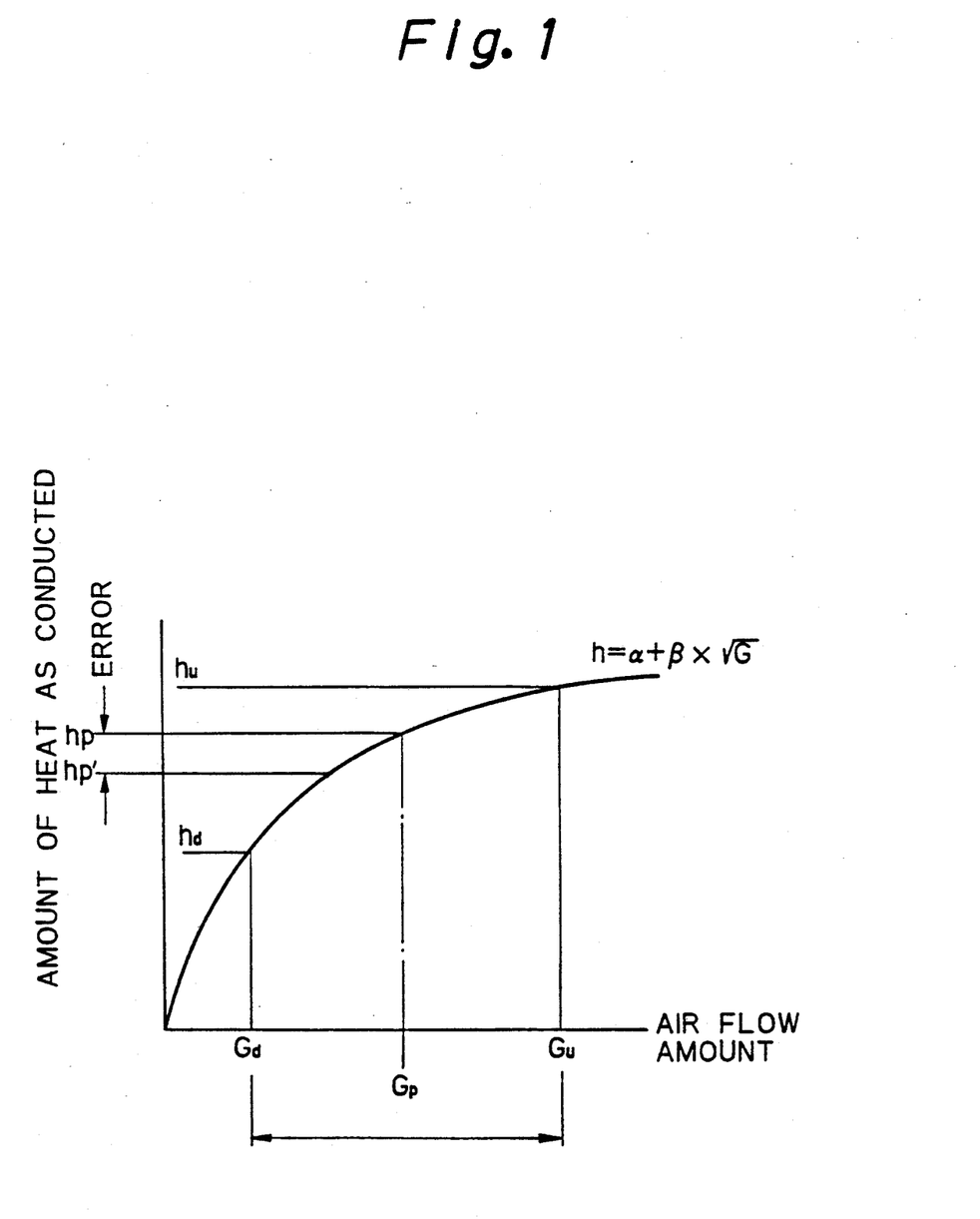
FIG. 1 shows a relationship between the intake air amount and an amount of heat conducted to the air.

In this type of the thermal type airflow meter, pulsative changes in the amount of the intake air, which are inevitable, cause variations in the amount of heat conducted for obtaining an increase of the temperature to a predetermined value, compared with that obtained when there are no pulsative changes even if an average amount of the intake air is maintained unchanged, causing a measurement error to occur. The reason for this is as follows. FIG. 1 shows a relationship between an intake air amount G and a conducted heat h, which is expressed by the following equation, $$h = \alpha + \beta \times \sqrt{G},$$

where $\alpha$ and $\beta$ are constant. Since the conduction of heat by the airflow meter is controlled by delay elements, such as a thermal volume, the output value of the airflow meter, for one moment is determined by a thermally conducted heat amount for a predetermined period prior to that moment, which results in a non-linear relationship between the G and the h. It is assumed that the flow amount is varied between the values of Gd and Gu, which causes the output to be moved between hd and hu, the mean value of which is hp'. When there is no pulsation of the intake air amount and a value of Gp, which is a mean value between the Gd and Gu, is attained the output level is hp, which is different from the hp' found during the pulsative changes of the intake air amount, and thus an error e occurs due to the pulsative changes in the flow amount of the intake air. As seen from FIG. 1, the existence of the pulsative changes in the airflow amount causes the sensor output level to be made lower than that obtained when there is no pulsation. Furthermore, the greater the degree of the pulsation, the greater the amount of the error, and thus a calculation of the fuel injection amount based on the measured value of the intake air amount causes a shortage in the amount of fuel injected, and thus an air-fuel ratio of the combustible mixture introduced into the engine becomes much leaner than desired.

Japanese Unexamined Utility Model Publication No. 61-14924 discloses a concept of calculating a ratio of an average value of the output from the air flow meter in a half period of one full cycle of a variation of the output level of the airflow meter, to thus provide a larger value, and an average value of the output in a remaining half period, to thus provide a smaller value. This ratio corresponds to a degree of pulsation in the output signal from the airflow meter. In this prior art, this value is used for the correction of a mean output value from the airflow meter, whereby a correct value of the intake air can be obtained which is not influenced by the effect of the pulsation.

This prior art calculates an integrated value of adjacent halves in one complete cycle of a variation of a sensor signal, a ratio of which integrated values is used to calculate a variation ratio which is multiplied by an average value of the detected signal in one full cycle to obtain a corrected, precise value of the amount of air introduced into the engine. This suffers from a drawback that, since a mean value in one full cycle is calculated to obtain the variation ratio, an acceleration or deceleration of the engine causes the value of the variation ratio to be displaced from the desired value. Also, such an acceleration or deceleration causes the mean value itself to be varied in one full cycle, which causes the integrated values found during consecutive half cycles to be changed independently of the effect of the pulsation. As a result, the variation ratio as a ratio of the integrated values in the consecutive half cycles in the sensor signal is different from the desired value, and accordingly, a correct compensation of the effect of the intake air amount pulsation on the intake air sensor signal can not be obtained, and thus a precise detection of the intake air amount can not be attained.

SUMMARY OF THE INVENTION

An object of the present invention is to provide a airflow sensor capable of detecting a precise value of the intake air amount which is not influenced by an acceleration or deceleration of the engine.

According to the present invention, an apparatus is provide for measuring an amount of air passed through an intake system for an internal combustion engine, which amount of air is pulsatively changed at a predetermined cycle, said apparatus comprising;

(a) a heat generating means arranged in the intake system for generating heat to be transmitted to the air flow;

(b) means for generating a timing signal for each sampling period which is shorter than the one full cycle of the pulsative change in the intake air amount;

(c) means for electrically energizing the heat generating means at each sampling period and for measuring a time needed to obtain a predetermined increase in a temperature of the heat generating element;

(d) means for calculating from said measured time at each sampling period an amount of intake air as measured;

(e) means for calculating at one full cycle an average of the measured values obtained at each sampling period;

(f) means for calculating from the measured values obtained at the consecutive sampling periods a degree of the variation in the intake air amount, and;

(g) means for obtaining an average intake air amount corrected in accordance with the calculated degree of variation.

DESCRIPTION OF THE PREFERRED EMBODIMENTS

Figure 2:
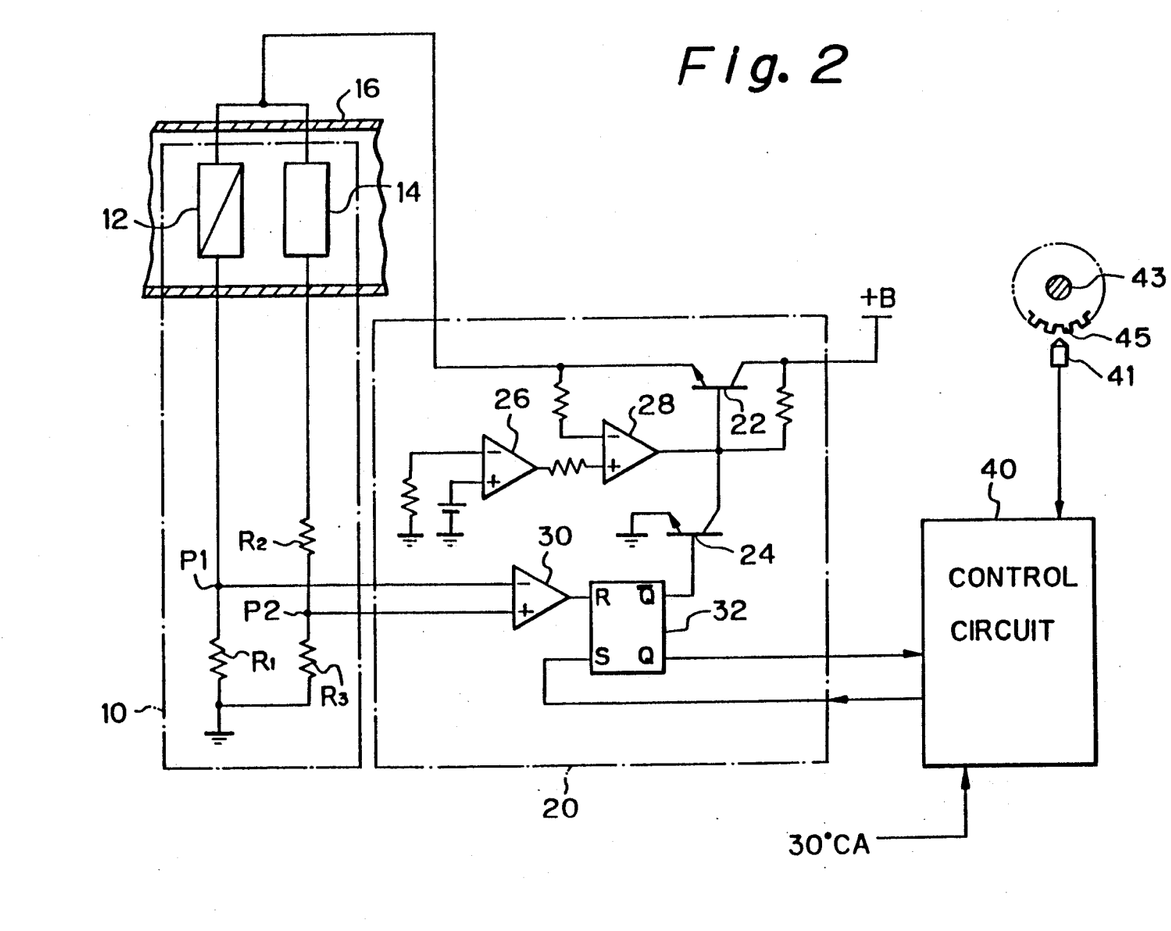
FIG. 2 shows a schematic view of the air flow sensor according to the present invention, together with an engine control circuit.

In FIG. 2, the airflow sensor includes a bridge circuit 10 comprising a temperature detection resister 12, a heat generating resistor 14, and adjusting resistors $R_1$, $R_2$, and $R_3$. The temperature detection resistor 12 and the heat generating resistor 14 are arranged in an intake pipe 16 of an internal combustion engine. The temperature detection resistor 12, the heat generating resistor 14, and the adjusting resistors $R_1$, $R_2$, and $R_3$ are interconnected so that a bridge circuit is constructed. The electric resistance value of the temperature detecting resistor 12 varies as the amount of air in the intake pipe introduced into the engine varies. A electric current control circuit 20 is provided for controlling the electric voltage applied to the heat generating resistor 14, so that the temperature of the heat generating resistor 14 is higher than that of the temperature detecting resistor 12 by a predetermined value. A means is provided for detecting a time for which the temperature of the heat generating resistor 14 is made higher than that of the temperature detecting resistor by the predetermined value, which time enables the intake air amount to the internal combustion engine to be determined.

The electric current control circuit 20 includes transistors 22 and 24, operating amplifiers 26, 28 and 30, and a flip-flop circuit 32. The transistor 22 controls the electric current in the heating resistance 14, and the operating amplifier 28 attains a feedback-control of a constant voltage of the electric voltage in the bridge circuit 10. The operating amplifier 28 is provided with an inverted input connected between the heat generating resistor 14 and transistor 22, and a non-inverted input connected to the operating amplifier 26, which applies a reference voltage to the operating amplifier 28 so that a constant voltage is applied to the bridge circuit 10. The bridge circuit 10 is provided with bridge points $P_1$ and $P_2$, which are respectively connected to inputs of the operating amplifier 30. The flip-flop circuit 32 is provided with a reset terminal R connected to the operating amplifier 30, a set terminal S connected to an engine control circuit 40, an inverted output connected to the base of the transistor 24, and a non-inverted output connected to the control circuit 40. The engine control circuit 40 is constructed as a microcomputer system for controlling the fuel injection amount and ignition timing. Such a fuel injection control and ignition timing control are not directly related to the present invention, and therefore, an explanation thereof is omitted.

As described later, the control of the application of the electric voltage by the bridge circuit 10 in this embodiment is carried out at intervals of 4 milliseconds. At the beginning of each interval of 4 milliseconds, a set signal is sent from the control circuit 40 to the set input S of the flip-flop circuit 32, which causes the inverted output of the flip-flop circuit 32 to become Low level. The low level at the inverted output of the flip-flop circuit 32 causes the transistor 24 to be made OFF, whereby the voltage level at the base of the transistor 22 is made High. The high level at the base causes the transistor 22 to be made ON, which causes the heat generating resistor 14 to be energized. When the energization of the resistor 14 is commenced, the voltage levels at the bridge points $P_1$ and $P_2$ are not balanced ($P_1 > P_2$), but when the temperature of the heat generating element 14 is higher than that of the temperature sensing element 12, by a predetermined value, a balanced condition of the voltage levels at the bridge points $P_1$ and $P_2$ is obtained, and thus the operating amplifier 30 outputs a High level signal to the reset terminal R of the flip-flop circuit 32, which then outputs a High level signal from the inverted output thereof, making the transistor 24 ON. When the transistor 24 is made ON, the level at the base of transistor 22 is made Low and thus it is made OFF, whereby the supply of electric current to the heat generating element 14 is stopped. The set terminal S and non-inverted output of the flip-flop circuit 32 are connected to the microcomputer 40, which is used for calculating the variation ratio and intake air amount from the time that the heat generating resistor 14 is energized.

In FIG. 2, a crank angle sensor 41 such as a Hall element is provided adjacent to a rotating element connected to a crank shaft (not shown) of an internal combustion engine. The rotating element is, for example, a distributing shaft 43 of a distributor (not shown) of the internal combustion engine. A toothed element 45 is connected to the shaft 43, so that the crank angle sensor 41 issues pulse signals at a predetermined angle of rotation of the crankshaft (CA), such as at 30 degrees CA.

Figure 3:
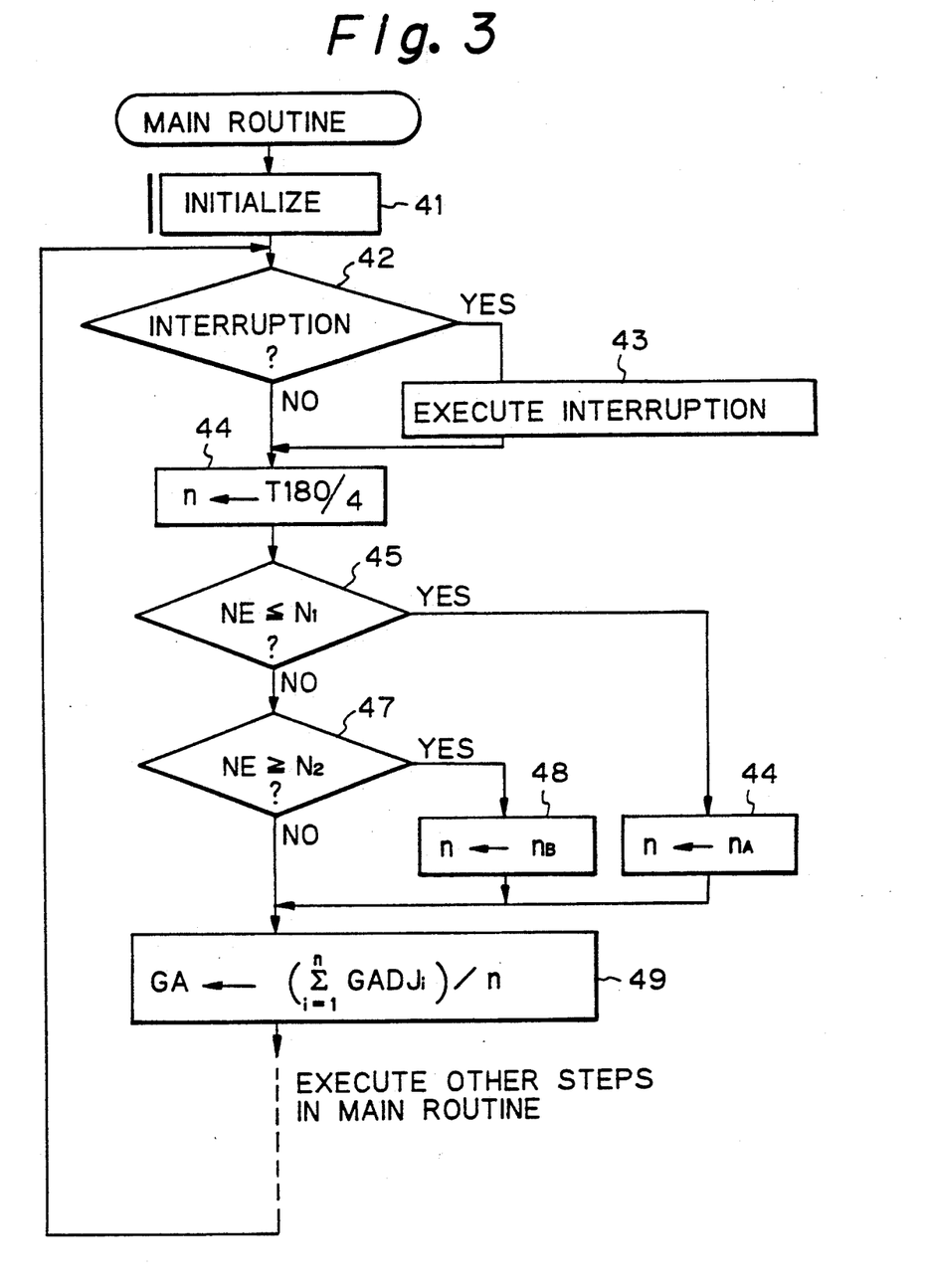
FIGS. 3 to 6 are flowcharts illustrating how the measurement of the intake air amount by the air-flow meter according to the present invention is carried out.

The operation of the microcomputer 40 will now be described with reference to the attached flowcharts. FIG. 3 shows a main routine which is executed when an ignition key switch (not shown) of the internal combustion engine is made ON. Step 41 generally shows an initialize routine which is adapted for initializing, for example, a RAM and registers. At the following step 42, it is determined if an interrupt requirement has occurred, and if so, the routine goes to step 43 to execute the interruption routines such as those shown in FIGS. 5 to 7.

Steps 44 to 49 show a part of the main routine for calculating an average intake air amount GA. At step 44, a number n of data of a corrected, measured intake air amount G in one measurement cycle, which is a basis for the calculation of the mean intake air amount GA, is calculated by $$n = T180/4,$$

where T180 is a time in milliseconds necessary for a rotation of the crankshaft (not shown) of a four cylinder internal combustion engine through an angle of 180 degrees, which corresponds to one cycle of pulsation in the intake air amount. For a six cylinder engine, a time necessary for a rotation of the crankshaft through an angle of 120 degrees is used, as it corresponds to one cycle of pulsation in the intake air for that engine. As described later, the measurement of the intake air amount is executed at intervals of 4 milliseconds, and thus T180 divided by 4 corresponds to a number of data of the measured intake air amount for a period in which the crankshaft is rotated through 180 degrees. At step 49, an average value of consecutive data of the measured intake air amount of a number n is calculated by $$GA = \left( \sum_{i=1}^{n} GADJ_i \right)/n.$$

Figure 8A:
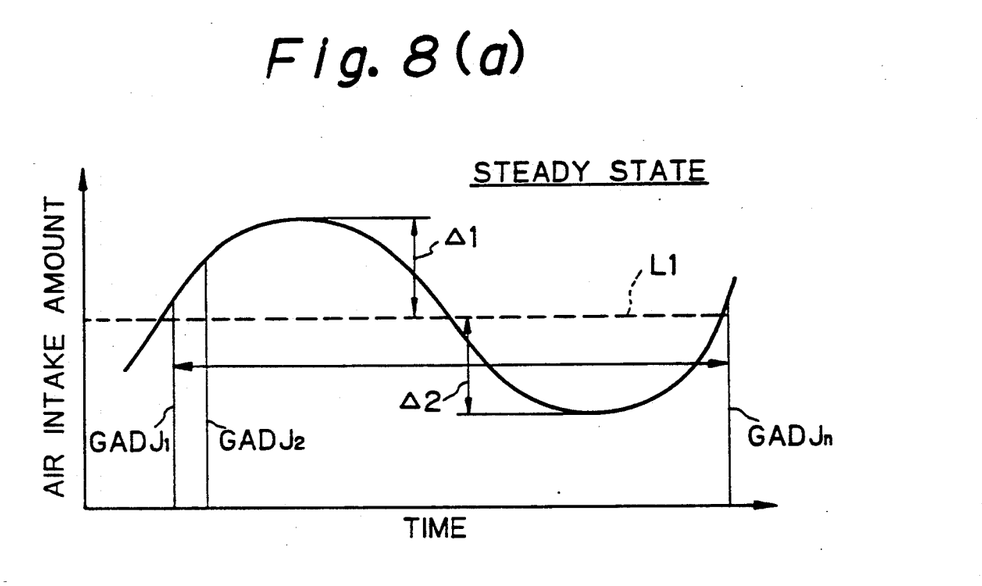
FIGS. 8(a) and 8(b) schematically illustrate pulsative changes in the measuring signal from the sensor according to the present invention.
Figure 8B:
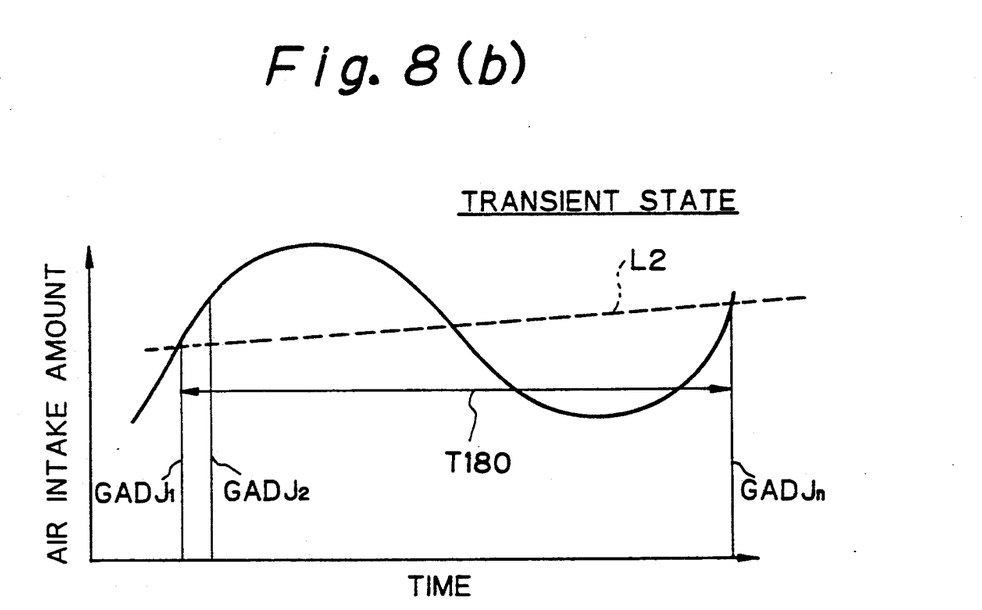

This averaged measured intake air amount is used for compensating the pulsation of the values of the measured intake air amount occurring during the rotation of the crankshaft. As shown in FIGS. 8(a) and (b), a pulsative change occurs in the value of the intake air amount, one cycle of which corresponds to 180 degrees of rotation of the crankshaft when the engine has four cylinders. The average value GA of the intake air amount is an average for this cycle.

Steps 45 and 46 are guard routines for limiting the values of n, in accordance with engine speed NE. At step 45, it is determined if the engine speed NE is smaller than a predetermined value $N_1$. When it is determined that $NE \leq N_1$, the routine goes to step 46 and a predetermined value $n_A$ is moved to n. When the engine speed is small where T180, which is a time needed for a 180 degrees rotation of the crankshaft, is relatively longer, a large value number n is obtained, and thus a predetermined fixed value $n_A$, even if smaller than the value calculated at step 44, is sufficient to obtain a desired precision of the average intake air amount.

At step 47, it is determined if the engine speed is higher than a predetermined value $N_2$. When it is determined that the $NE \geq N_2$, the routine goes to step 48 and a predetermined value $n_B$ is moved to n. When the engine speed is high, sometimes a time for one full cycle is equal to or shorter than that for a sampling period of the intake air measurement. The predetermined value $n_B$ is selected so that a desired average value of the measured intake air amount is obtained, whereby the effect of the pulsation of the intake air amount is cancelled.

Figure 4:
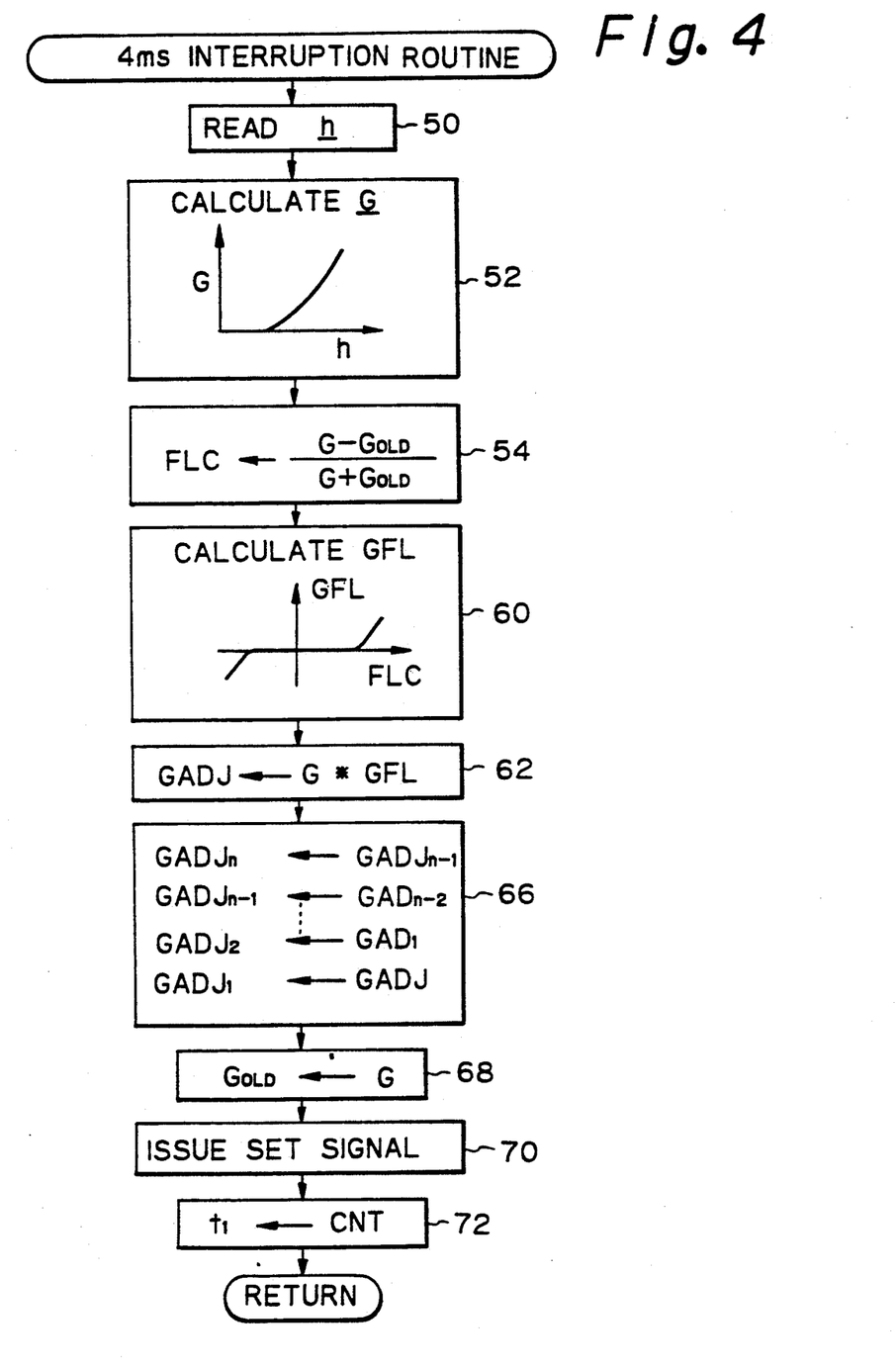

FIG. 4 is a routine which is executed at intervals of 4 milliseconds. At step 50, a value of data of an energizing period h is read out, which is an ON time of the heat generating element 14 obtained when this routine is carried out at the preceding timing, i.e., 4 milliseconds before, and at step 52, a measured intake air amount G at this moment is calculated from the h. A predetermined relationship exists between the intake air amount G and the ON time h, which is stored as a map in a memory of the microcomputer 40, and a map interpolation calculation is carried out to obtain a value of the intake air amount G corresponding to the read out energizing time h. At the following step 54, a variation rate FLC is calculated by $$FLC = (G - G_{OLD})/(G + G_{OLD}),$$

where $G_{OLD}$ is a value of the variation rate obtained at the preceding cycle (4 milliseconds before). This equation corresponds to a ratio of the sum and difference of values of the measured intake air amount obtained at two consecutive sampling periods (4 milliseconds), and this ratio represents a degree of measurement error of the intake air amount due to a pulsation of the intake air amount. As is clear, the greater the pulsation of the intake air amount, the larger the absolute value of the ratio FLC. Furthermore, the ratio FLC has a positive value when the intake air amount is increasing, and a negative value when the intake air amount is decreasing. At step 60, a factor GFL is calculated and is used for converting the variation rate FLC to a correction factor GFL. A desired relationship between the variation ratio FLC and the correction factor GFL is such that, when the variation ratio is smaller than a predetermined value, the correction factor GFL is maintained at 1.0, and thus a correction of the measured intake air amount is not carried out, and when the variation ratio is higher than a predetermined value, the correction factor GFL is increased in accordance with the increase in the value of the FLC. It should noted that a map of data of values of the correction factor GFL with respect to the values of the correction ratio FLC is provided, and a well known map interpolation is carried out to obtain a value of the correction factor GFL corresponding to the value of the FLC calculated at the step 54.

At step 62, a corrected average intake air amount, GAADJ is calculated by $$GADJ = G \times GFL,$$

and is used for calculating the fuel injection amount and ignition timing.

At step 66, consecutive measured values of the intake air amount in one complete cycle of the variation, $GADJ_1$, $GADJ_2$, . . . , and $GADJ_n$, are updated. Namely, the newest measured value GADJ at step 62 is moved into $GADJ_1$, and the previous value of $GADJ_1$ is moved into $GADJ_2$. Similarly, the previous value $GADJ_{n-1}$ is moved into $GADJ_n$. At step 68, the value of G calculated at the step 52 is moved to $G_{OLD}$ for calculation in the following execution. At step 70, a set signal is output to the set terminal of the flip-flop circuit 32 by the control circuit 40, and accordingly, the heat generating element 14 is energized for this execution period of 4 milliseconds. At step, a value of a counter CNT is moved into $t_1$, which indicates the time at which the energization of the heater element 14 for this period is commenced.

Figure 5:
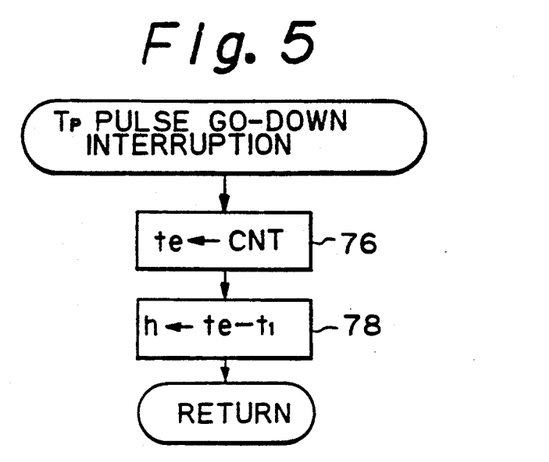

FIG. 5 is a routine commenced when a condition of the non-inverted output from the flip-flop circuit 32 is changed from High level to Low level, i.e., the heat generating element 14 is made OFF because the temperature of the heat generating element 14 is higher than that of the heat measuring element 12, by the predetermined value. At step 76, the value of the counter CNT is moved into $t_e$, which indicates the time at which the energization of the heater element 14 for this period is stopped. At step 78, the ON time h of this cycle is calculated as $t_e$ subtracted by $t_1$. Namely, $t_e - t_1$ is a time for which the heat generating element 14 is energized at this cycle of 4 milliseconds, and is used for calculating the intake air amount G at step 62 during the execution of the following 4 milliseconds routine in FIG. 4.

Figure 6:
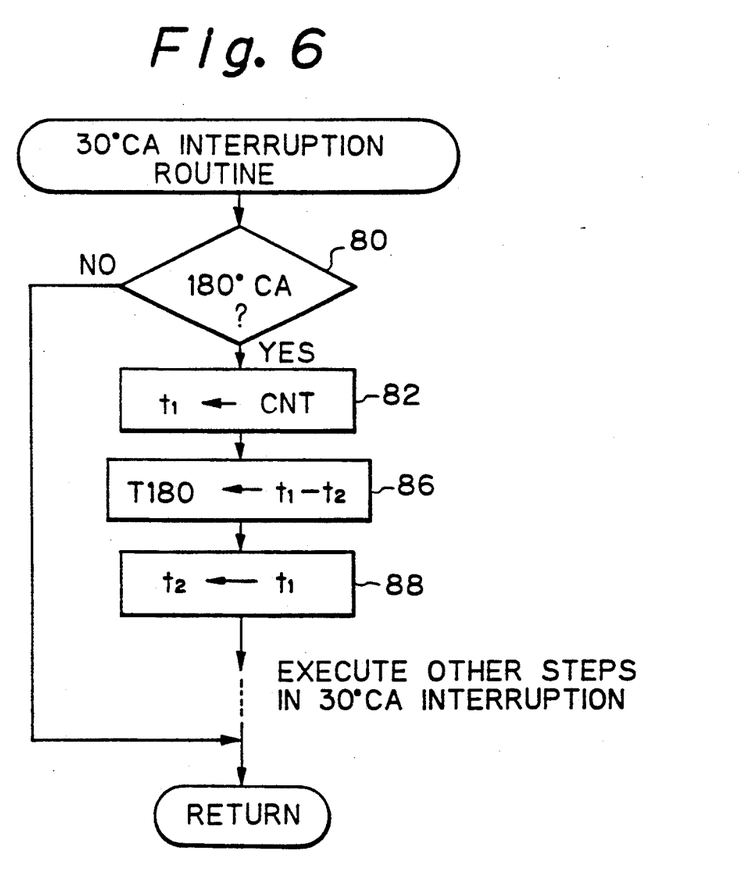

FIG. 6 shows a crankangle interruption routine carried out at each 30 degrees pulse signal output from the crank angle sensor 41. At step 80, it is determined if the crankshaft has rotated through an angle of 180 degrees, which corresponds to one complete cycle of pulsative change in the intake air in a four cylinder engine in this embodiment. When it is determined at step 80 that a 180 degree rotation has been obtained, the routine goes to step 82 and the value of the counter CNT is moved to $t_1$. At step 86, the time T180 for a rotation by 180 degrees of the crankshaft, which corresponds to one complete cycle of pulsative change in the intake air amount, is calculated as $t_1$ subtracted by $t_2$, and at step 88 the value of $t_1$ obtained at step 82 is moved to $t_2$. In this routine of FIG. 6, other routines to be executed at every 30 degrees CA of rotation are carried out, such as a fuel injection control and ignition timing control, as is well known.

Figure 7A:
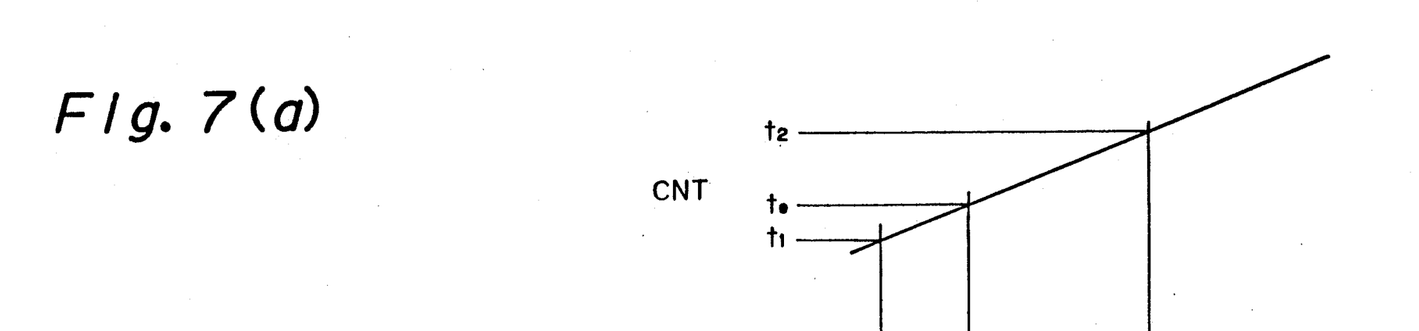
FIGS. 7(a) to (d) are timing charts illustrating the measuring operation of the sensor according to the present invention.
Figure 7B:
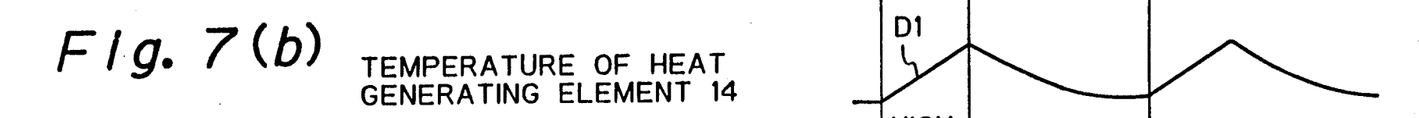

FIGS. 7(a) to (d) illustrate how the timing control in the first embodiment is carried out. The value of the counter CNT continuously increases, as shown in FIG. 7(a), and at a time $t_1$, a set signal is output to the flip-flop circuit 32 at step 70 in FIG. 4, whereby the voltage level at the base of the transistor 24 is made low level, causing the transistor 24 to be made OFF and the transistor 22 to be made ON, whereby the heating by the heat generating element 14 is commenced, and as a result, the temperature of the element 14 is increased as shown by a line D1 in FIG. 7(b).

Figure 7C:
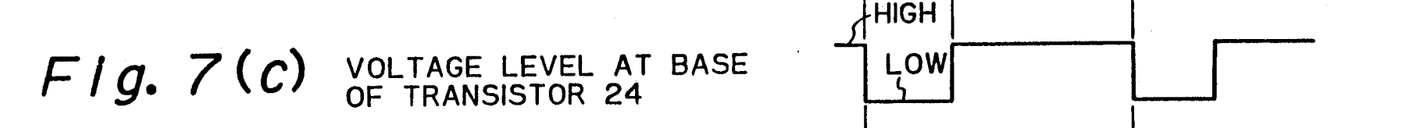

At a time $t_e$, i.e., when the temperature of the heat generating element 14 is higher than that of the temperature detecting element 12 by the predetermined value at step 76 in FIG. 5, the voltage levels at the bridge points $P_1$ and $P_2$ are balanced, whereby the flip-flop circuit 32 is reset, and accordingly, the voltage level at the base of the transistor 24 is made high, as shown by FIG. 7(c), causing the transistor 24 to be made ON and the transistor 22 to be made OFF, and thus the heat generating element 14 is de-energized.

Figure 7D:
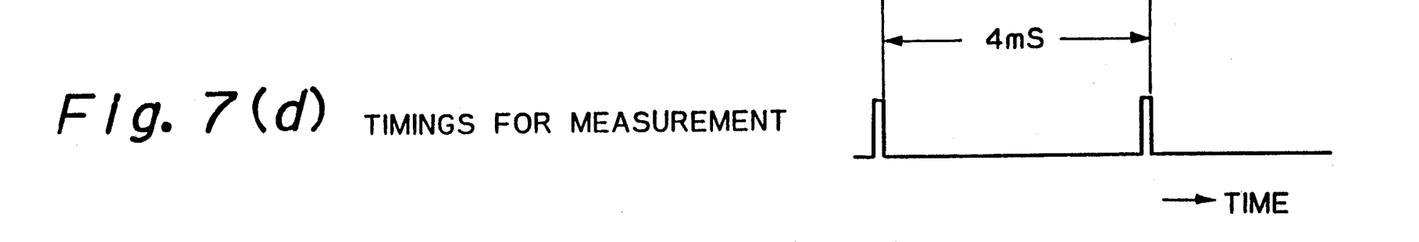

This process is repeated at each measuring timing as shown in FIG. 7(d), at intervals of 4 milliseconds.

The essence of the present invention is that the calculating of the variation rate FLC obtains measured values between consecutive sampling periods (4 milliseconds in the first embodiment) which are shorter than one full cycle T180, to obtain an average intake air amount GA at step 49. Since the variation rate FLC is obtained from the measured values of the intake air amount in consecutive sampling periods, which are shorter than the one full cycle of variation, the variation rate is relatively unaffected by changes in the average intake air amount in one full cycle of pulsation caused by an acceleration or deceleration of the engine.

Contrary to this, in the prior art, the measurement of the variation rate is made within the one full cycle of the variation. FIG. 8(a) schematically shows a change in the measured intake air amount in one full cycle of variation when the engine is in a steady state. To obtain the variation rate, a ratio of a difference between the integrated values of the measured intake air amount for consecutive half cycles to the sum of such an integrated value, which corresponds to $(\Delta 1 - \Delta 2)/(\Delta 1 + \Delta 2)$, is calculated. It should be noted that the wave heights $\Delta 1$ and $\Delta 2$ of the consecutive half cycles during one pulsation are not the same, due to the non-linear characteristic of the heat conducted to the air to the intake amount as shown in FIG. 1. This prior art can obtain a desired precision of the variation rate when the engine is in a steady state at which an average measured intake air amount is unchanged, as shown by a line L1 in FIG. 8(a). The prior art method, however, suffers from a drawback in that a precise variation rate cannot be obtained when the engine is accelerating or decelerating. When the engine is in an acceleration or deceleration made, the average measured intake air amount per se is changed as shown by a line L2. In this case, the variation $\Delta 1$ or $\Delta 2$ is affected by the change in the average value, and thus a correct variation rate cannot be detected, and therefore, a desired precision of the intake air amount as corrected by the detected pulsation cannot be obtained. Contrary to this, according to the present invention, the variation rate is calculated, in place of the integrated values in one cycle of the engine, from the values of the measured intake air amount at the consecutive sampling timings, for example, $GADJ_1$ and $GADJ_2$. The spacing between the sample timings are shorter than a one full cycle of pulsation, and therefore, the obtained value of the rate of variation is less affected by the acceleration or deceleration of the engine, and as a result, a desired precision of the variation rate can be obtained regardless of the engine condition.

Figure 9:
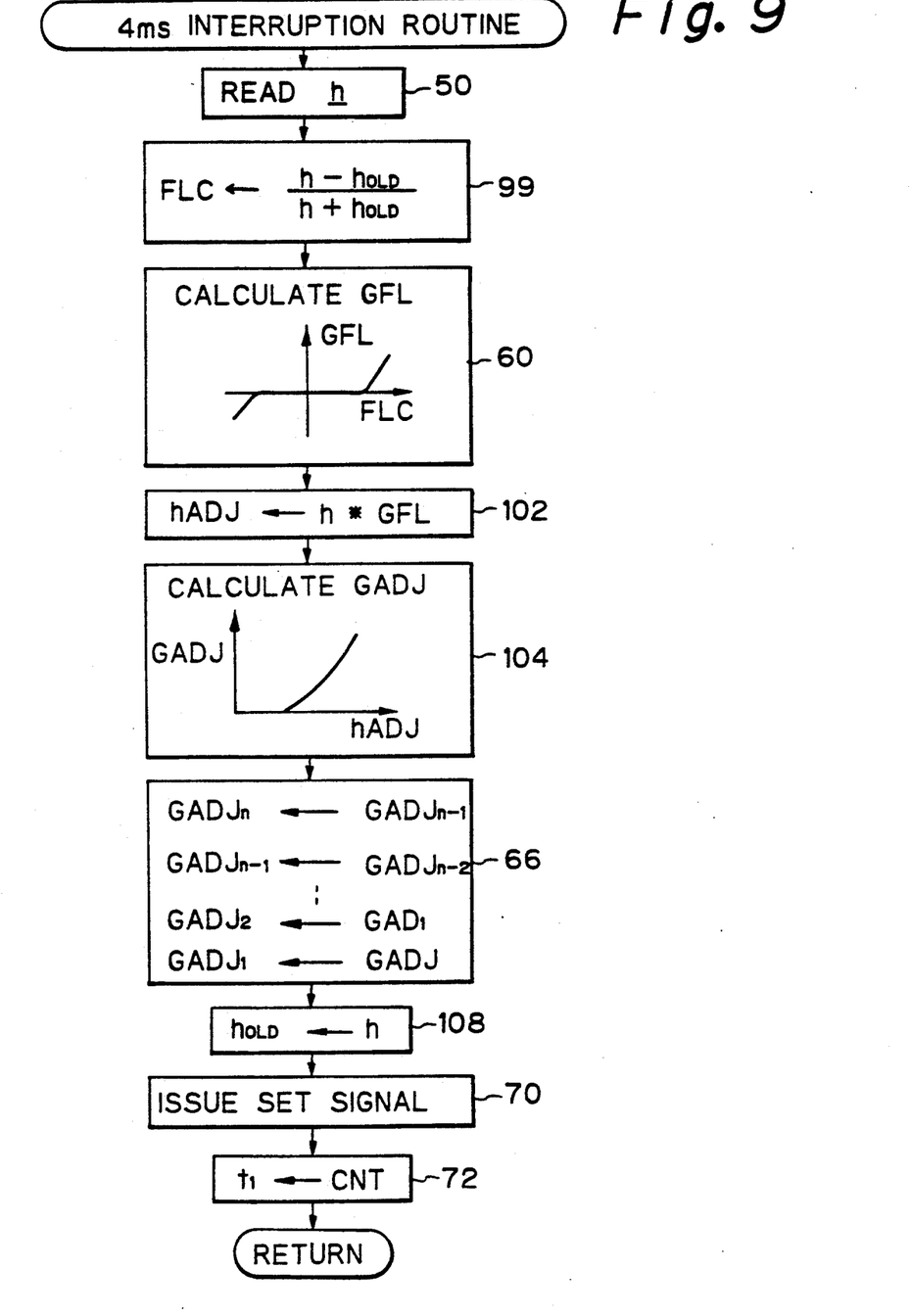
FIG. 9 is a flowchart of the second embodiment, which correspond to FIG. 4 of the first embodiment.

FIG. 9 show a 4 millisecond interruption routine for a second embodiment. In step 99, a variation rate FLC is calculated by $$FLC = (h - h_{OLD})/(h + h_{OLD}),$$

where $h_{OLD}$ is a value of the energization time obtained at the preceding cycle (4 milliseconds before). As easily seen, in the second embodiment, the variation rate FLC is calculated from the energization time h before it is converted to the intake air amount, and then the variation rate FLC is converted to the correction factor GFL.

At step 102, an energizing period hADJ compensated by the intake air amount is calculated by $$hADJ = h \times GFL.$$

At step 104, similar to step 52 in FIG. 4 in the first embodiment, a measured intake air amount GADJ at this moment is calculated from the hADJ.

At step 108, the value of h at that moment is moved to $h_{OLD}$, which is used at step 99 at the following timing (4 milliseconds after that moment).

The remaining steps in FIG. 9 are the same as described in FIG. 4.

Although embodiments of the present invention are described with reference to the attached drawings, many modifications and changes thereto can be made by those skilled in this art.

We Claim:

1. An apparatus for measuring an amount of air passed through an intake system for an internal combustion engine, which amount of air is pulsatively changed at a predetermined cycle, said apparatus comprising;
    (a) a heat generating means arranged in the intake system for generating heat to be transmitted to the air flow;
    (b) means for generating a timing signal for each sampling period which is shorter than the one full cycle of the pulsative change in the intake air amount;
    (c) means for electrically energizing the heat generating means at each sampling period for measuring a time needed for obtaining a predetermined increase in a temperature of the heat generating means;
    (d) means for calculating from said measured time at each sampling period, an amount of the intake air as measured;
    (e) means for calculating at said one full cycle, an average of the measured intake air amount values obtained at each sampling period;
    (f) means for calculating, from the measured values obtained at the consecutive timings, a ratio of the difference of these values from the sum of these values, and;

(g) means for obtaining an average intake air amount corrected in accordance with the ratio obtained at (f).

2. An apparatus for measuring an amount of air passed through an intake system for an internal combustion engine, which amount of air is pulsatively changed at a predetermined cycle, said apparatus comprising;

(a) a heat generating means arranged in the intake system for generating heat to be transmitted to the air flow;

(b) means for generating a timing signal for each sampling period which is shorter than the one full cycle of the pulsative change in the intake air amount;

(c) means for electrically energizing the heat generating means at each sampling period for measuring a time needed for obtaining a predetermined increase in a temperature of the heat generating means;

(d) means for calculating from said measured time at each sampling period, an amount of the intake air as measured;

(e) means for calculating, from the measured intake air amount values obtained at the consecutive timings, a ratio of the difference of these values from the sum of these values;

(f) means for calculating a correction factor from the ratio obtained at (e);

(g) means for obtaining a measured intake air amount as corrected by multiplying the correction factor at (g) to the measured value at (d), and;

(h) means for calculating at said one full cycle an average of the corrected measured intake air amount values obtained at (g).

3. An apparatus for measuring an amount of air passed through an intake system for an internal combustion engine, which amount of air is pulsatively changed at a predetermined cycle, said apparatus comprising;

(a) a heat generating means arranged in the intake system for generating heat to be transmitted to the air flow;

(b) means for generating a timing signal for each sampling period which is shorter than the one full cycle of the pulsative change in the intake air amount;

(c) means for electrically energizing the heat generating means at each sampling period for measuring a time needed for obtaining a predetermined increase in a temperature of the heat generating means;

(d) means for calculating, for measured time values obtained at the consecutive timings, a ratio of the difference of these values from the sum of these values;

(e) means for correcting at each sampling period the measured time at (c) by the ratio obtained at (d);

(f) means for calculating at each sampling period an intake air amount from the corrected time at (e), and;

(g) means for calculating in said one full cycle an average value of the intake air amount obtained at (f).

* * * * *